(12) United States Patent
Ohtani et al.

(10) Patent No.: US 7,157,540 B2
(45) Date of Patent: Jan. 2, 2007

(54) OLEFINIC POLYMER AND PROCESS FOR PRODUCING THE SAME

(75) Inventors: Satoru Ohtani, Ichihara (JP); Shinji Abe, Tokyo (JP); Hiroto Nishida, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 11/246,075

(22) Filed: Oct. 11, 2005

(65) Prior Publication Data

US 2006/0036048 A1    Feb. 16, 2006

Related U.S. Application Data

(62) Division of application No. 10/400,572, filed on Mar. 28, 2003, now Pat. No. 7,037,998.

(30) Foreign Application Priority Data

Mar. 29, 2002  (JP) .............................. 2002-096820

(51) Int. Cl.
    *C08F 210/02*  (2006.01)
(52) U.S. Cl. ..................... 526/348; 526/89; 526/160; 526/348.2; 526/943
(58) Field of Classification Search .............. 526/348, 526/160, 89, 348.2, 943
    See application file for complete search history.

(56) References Cited

U.S. PATENT DOCUMENTS

| 4,543,399 | A | 9/1985 | Jenkins, III et al. |
| 5,371,053 | A | 12/1994 | Agapiou et al. |
| 5,405,922 | A | 4/1995 | DeChelllis et al. |
| 5,428,127 | A | 6/1995 | Asanuma et al. |
| 5,990,272 | A | 11/1999 | Yamamoto et al. |
| 6,117,955 | A | 9/2000 | Agapiou et al. |
| 2002/0198341 | A1 | 12/2002 | Takahashi |

FOREIGN PATENT DOCUMENTS

| EP | 0 004 601 A1 | 10/1979 |
| EP | 0 253 616 A1 | 1/1988 |
| EP | 0 419 681 A1 | 4/1991 |
| EP | 0 629 632 A2 | 12/1994 |
| EP | 0 634 421 A1 | 1/1995 |
| EP | 0 703 245 A2 | 3/1996 |
| EP | 0 808 850 A1 | 11/1997 |
| EP | 1 054 025 A1 | 11/2000 |
| EP | 0 728 151 B1 | 3/2001 |
| EP | 1 209 179 A1 | 5/2002 |
| EP | 1 348 719 A1 | 10/2003 |
| GB | 1006469 | 10/1965 |
| JP | 06-228236 A | 8/1994 |
| JP | 06-228253 A | 8/1994 |
| JP | 10-045824 A | 2/1998 |
| WO | WO-98/30605 A1 | 7/1998 |
| WO | WO-01/77193 A1 | 10/2001 |

OTHER PUBLICATIONS

Encyclopedia Of Chemical Technology, 4th Ed., vol. 17, pp. 767, 768, 783, (1996).
Yingopoulous et al., European Symposium on Computer Aided Process Engineering, pp. 327-332 (2001).
Jiang et al., Ind. Eng, Chem. Res., vol. 36, pp. 1176-1180 (1997).
Litteer, Popular Plastics & Packaging, pp. 67-72 (1998).

*Primary Examiner*—Caixia Lu
(74) *Attorney, Agent, or Firm*—Birch,Stewart,Kolasch, and Birch, LLP

(57) ABSTRACT

The olefinic polymer characterised in that the n-decane-soluble content thereof is 10% by weight or less and the content of a ligand having a cyclopentadienyl structure is 5 ppb by weight or less. The process for producing an olefinic polymer is a process of producing an olefinic polymer by (co)polymerizing olefins in a gas phase using a fluidized-bed reactor, the process comprising: a polymerization step of (co)polymerizing the olefins with allowing a saturated aliphatic hydrocarbon to exist in a concentration of 2 to 30 mol % in the fluidized-bed reactor and a ligand removing step involving a step of bringing the resulting (co)polymer into contact with a ligand-remover and a step of heating said (co)polymer which has been brought into contact with the ligand-remover.

2 Claims, 4 Drawing Sheets

OLEFINIC POLYMER AND PROCESS FOR PRODUCING THE SAME

This application is a Divisional of application Ser. No. 10/400,572, filed on Mar. 28, 2003, now U.S. Pat. No. 7,037,998 B2, the entire contents of which are hereby incorporated by reference and for which priority is claimed under 35 U.S.C. § 120.

FIELD OF THE INVENTION

The present invention relates to an olefinic polymer and a process for producing the same, and more specifically, to an olefinic polymer having low content of components that might generate odors and of components that might change taste and to a process for producing such an olefinic polymer in an efficient manner.

BACKGROUND OF THE INVENTION

Olefinic polymers such as polyethylenes, polypropylene, ethylene/α-olefin copolymers and propylene/α-olefin copolymers are widely used for various molding materials and the like. The characteristics required for these olefinic polymers differ depending on the use thereof. For example, the olefinic polymer for food use is required not to damage the taste of foods because a delicate smell and taste are regarded as important.

In the meantime, when, in the production of an olefinic polymer, olefins are polymerized by a vapor phase polymerization method in the presence of a solid state catalyst, the polymer can be obtained in the form of a particle and such as a step of precipitating a polymer and a step of separating solvents after polymerization become needless. Therefore, this is known to be able to simply the production process and to reduce the production cost. However, the olefinic polymer produced by a vapor phase polymerization method sometimes exudes an odor when processed with heat and this may affect flavors and the like especially when the olefinic polymer is employed for food use where a delicate smell and taste are regarded as important. Therefore, the use of these polymers are occasionally limited in such uses.

As a method of reducing the influence of the odor of the olefinic polymer obtained by a vapor phase polymerization method and the influence of the olefinic polymer on taste when it is used for food uses, for example, a method is described in the publication of Japanese Patent Application Laid-Open No. 10-45824 for decreasing the odor emanated from the olefinic polymer during molding by contacting the olefinic polymer obtained using a metallocene catalyst with steam and the like to decompose the cyclopentadienyl ligand in the polymer.

Although the odor of the olefinic polymer can be considerably decreased by the method like this, it has been desired to further decrease odors in food use and the like in recent years.

In this situation, the inventors of the present invention have made studies and, consequently reached to the completion of the present invention with a finding that upon producing a olefinic polymer by a vapor phase polymerization method, the odor is greatly reduced by carrying out the polymerization reaction in the presence of a saturated aliphatic hydrocarbon in a fluidized bed reactor and then contacting the obtained polymer with steam and the like.

OBJECT OF THE INVENTION

Accordingly, it is an object of the invention to provide an olefinic polymer having the reduced content of components that might emanate odors and of components that might change tastes and also to provide a process for producing the olefinic polymer.

SUMMARY OF THE INVENTION

An olefinic (co)polymer according to the present invention is a olefinic (co)polymer obtained by polymerizing at least one selected from ethylene and α-olefins having 3 to 20 carbon atoms in the presence of a metallocene type catalyst, wherein the n-decane-soluble content is 10% by weight or less and the content of a ligand having a cyclopentadienyl structure is 5 ppb by weight or less.

The olefinic polymer is preferably a copolymer of ethylene and at least one α-olefin selected from α-olefins having 3 to 20 carbon atoms.

Also, the olefinic polymer preferably has a density of 0.930 g/cm$^3$ or less.

Further, the olefinic polymer is preferably the one obtained by (co)polymerizing one or two or more olefins selected from ethylene and α-olefins having 3 to 20 carbon atoms in a vapor phase using fluidized-bed reactor.

Furthermore, the olefinic polymer is preferably the one obtained by (co)polymerizing one or two or more olefins selected from ethylene and α-olefins having 3 to 20 carbon atoms with allowing a saturated aliphatic hydrocarbon having 2 to 10 carbon atoms to exist with a concentration of 2 to 30 mol % in a fluidized bed reactor, then bringing the resulting (co)polymer into contact with a ligand-remover and then heating the (co)polymer which has been brought into contact with the ligand-remover.

A process for producing an olefinic polymer according to the present invention is a process of producing an olefinic polymer by (co) polymerizing one or two or more olefins selected from ethylene and α-olefins having 3 to 20 carbon atoms in the presence of a metallocene type catalyst in a gas phase using a fluidized-bed reactor, the process comprising:

a polymerization step of (co)polymerizing olefins with allowing a saturated aliphatic hydrocarbon to exist with a concentration of 2 to 30 mol % in the fluidized-bed reactor; and a ligand removing step involving a step of bringing the resulting (co)polymer into contact with a ligand-remover and a step of heating the (co)polymer which has been brought into contact with the ligand-remover.

In the present invention, the above saturated aliphatic hydrocarbon is preferably supplied to a fluidized-bed reactor in the vapor-liquid two-phase coexisting state.

The process for producing an olefinic polymer can produce an olefin polymer having the n-decane-soluble content of 10% by weight or less and the content of 5 ppb by weight or less for a ligand having a cyclopentadienyl structure.

DETAILED DESCRIPTION OF THE INVENTION

Figure 1:
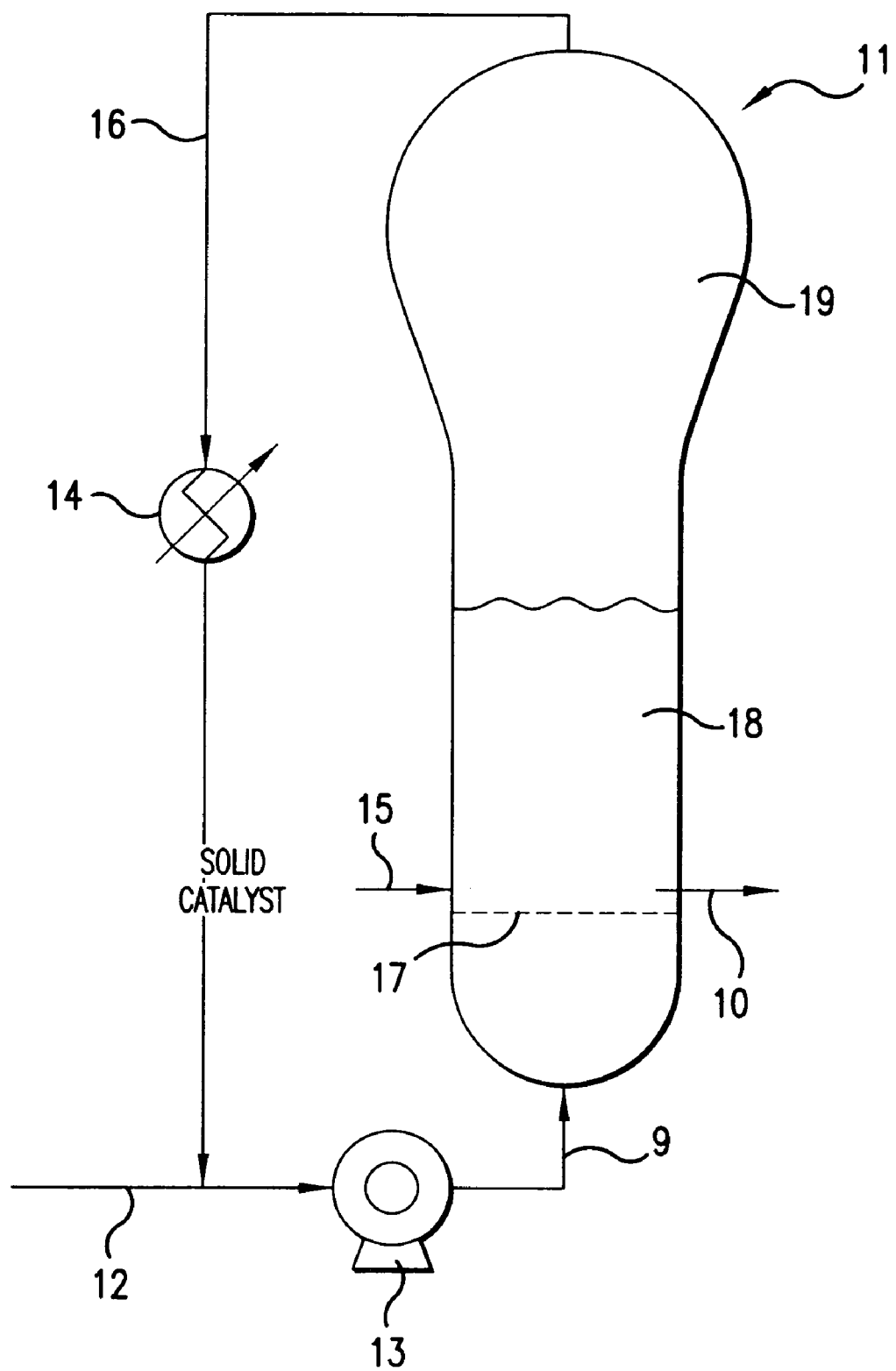
FIG. 1 is an explanatory view showing the case of carrying out a polymerization step in single stage.

An olefinic polymer according to the present invention and a process for producing the olefinic polymer will be hereinafter explained in detail.

It should be noted that there is the case where the term "polymerization" is used in terms of meanings implying not only homopolymerization but also copolymerization, and also there is the case where the term "polymer" is used in terms of not only a homopolymer but also a copolymer.

[Olefinic Polymer]

The olefinic polymer according to the present invention is a (co)polymer of one or two or more olefins selected from ethylene and α-olefins having 3 to 20 carbon atoms.

Here, specific examples of the α-olefins having 3 to 20 carbon atoms include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. Among these compounds, α-olefins having 3 to 10 and particularly 5 to 8 carbon atoms are preferably used.

The olefin selected from ethylene and these α-olefins having 3 to 20 carbon atoms may be used alone or in combination of two or more of them.

In the present invention, the olefinic polymer is preferably a copolymer of ethylene and at least one α-olefin selected from α-olefins having 3 to 20 carbon atoms and more preferably a copolymer of ethylene and at least one α-olefin selected from α-olefins having 3 to 10 carbon atoms.

When the olefinic polymer according to the present invention is a copolymer of ethylene and at least two or more monomers selected from α-olefins having 3 to 20 carbon atoms, no particular limitation is imposed on the proportion of the content of each structural unit. However, for example, when the copolymer is a copolymer of ethylene and an α-olefin, the copolymer preferably contains 80 to 99.6 mol % and more preferably 93.8 to 98 mol % of a structural unit derived from ethylene, and preferably 0.4 to 20 mol % and more preferably 2 to 6.2 mol % of a structural unit derived from the α-olefin.

Also, in the present invention, the olefinic polymer may contain a structural unit derived from polyenes depending on the need together with the structural units derived from ethylene and α-olefins having 3 to 20 carbon atoms. For example, the olefinic polymer may contain structural units derived from conjugate dienes such as butadiene and isoprene and from non-conjugate dienes such as 1,4-hexadiene, dicyclopentadiene and 5-vinyl-2-norbornene.

The n-decane-soluble content of the olefinic polymer according to the present invention is 10% by weight or less, preferably 5% by weight or less and more preferably 3% by weight or less. The lower limit of the n-decane-soluble content is preferably 0% by weight, but substantially 0.1% by weight which is a measurable limit.

Since the olefinic polymer whose a n-decane-soluble content falls within the above range has the reduced content of low-molecular weight components such as oligomers, less odor emanates from the olefinic polymer during molding and also, the olefinic polymer scarcely damages a delicate smell and taste when it is employed in food uses.

The n-decane-soluble content is measured in the following manner. Specifically, an one-litter flask equipped with a stirring device is charged with 3 g of a polymer sample, 20 mg of 2,6-di-tert-butyl-4-methylphenol and 500 ml of n-decane and the mixture is dissolved at 145° C. in an oil bath by heating. After the polymer sample is dissolved, the mixture is cooled to ambient temperature over about 8 hours and in succession, kept in a 23° C. water bath for 8 hours. The precipitated polymer (n-decane-insoluble part) is separated from a n-decane solution containing a dissolved polymer by filtration using a G-4 (or G-2) glass filter. The solution obtained in this manner is heated under the condition of 10 mmHg and 150° C. to dry the polymer dissolved in the n-decane solution till the weight of the polymer becomes constant and the weight is defined as the n-decane-soluble content.

Also, in the olefinic polymer according to the present invention, the content of a ligand having a cyclopentadienyl structure is 5 ppb by weight or less, preferably 2 ppb by weight or less and more preferably 1 ppb by weight or less. The lower limit of the content of the ligand having a cyclopentadienyl structure is preferably 0 ppb by weight, but substantially 1 ppb by weight which is a measurable limit.

When the content of the ligand having a cyclopentadienyl structure is within the above range, less odors emanates from the olefinic polymer during molding and also, the olefinic polymer scarcely damages a delicate smell and taste when it is employed in food uses.

The content of the ligand having a cyclopentadienyl structure is measured in the following manner. Specifically, the ligand having a cyclopentadienyl structure is extracted using toluene and identified and measured quantitatively by gas chromatograph mass spectrometer using a calibration curve method.

The olefinic polymer according to the present invention has the characteristics that the number average molecular weight (Mn) measured by gel permeation chromatography (GPC) falls in a range from, typically, 1,250 to 8,500, the Mw/Mn falls in a range from typically 1.8 to 3.5 and preferably 1.9 to 2.3, the density measured by a density gradient method is typically 0.930 g/cm$^3$ or less and preferably in a range from 0.880 to 0.930 g/cm$^3$.

The olefinic polymer according to the present invention as aforementioned is obtained by (co)polymerizing one or two or more olefins selected from ethylene and α-olefins having 3 to 20 carbon atoms in a vapor phase using, for example, a fluidized-bed reactor.

To state more concretely, the olefinic polymer is obtained by (co)polymerizing one or two or more olefins selected from ethylene and α-olefins having 3 to 20 carbon atoms with allowing a saturated aliphatic hydrocarbon to exist in a fluidized-bed reactor, then bringing the obtained (co)polymer into contact with a ligand remover and then heating the (co)polymer which is made to be in contact with the ligand-remover.

[Process for Producing the Olefinic Polymer]

The process for producing the olefinic polymer according to the present invention comprises:

a polymerization step of (co)polymerizing olefins in the presence of a saturated aliphatic hydrocarbon in a fluidized-bed reactor; and a ligand removing step of bringing the obtained (co)polymer into contact with the ligand-remover and then heating the (co)polymer which has been made to be in contact with the ligand-remover. The process will now be described by way of embodiment in conjunction with the accompanying drawings.

(Polymerization Step)

In the polymerization step, at the fluidized-bed where a solid particle containing a catalyst is maintained in a fluidized state by means of a gas stream flowing containing a polymerizable monomer through the inside of the fluidized bed reactor, the polymerization reaction is carried out by introducing a saturated aliphatic hydrocarbon in a gas-liquid mixed state together with the polymerizable monomer from the bottom of the fluidized-bed reactor upon producing an olefinic polymer by polymerizing at least one olefin selected from ethylene and α-olefins having 3 to 20 carbon atoms (polymerizable monomer) in a vapor phase under the presence of the catalyst.

Here, the polymerization step will be explained in detail with reference to FIG. 1. Incidentally, the FIG. 1 shows only the polymerization step and the ligand removing step is omitted.

In the polymerization step, the catalyst is supplied from a line 15 in a fluidized-bed reactor 11, and also the polymerizable monomers and saturated aliphatic hydrocarbon supplied from a supply line 12 are passed through the reactor by blowing the mixture into the fluidized bed 18 from a supply port 9 through a diffusing plate 17 such as a perforated plate disposed on the under part of the reactor and by discharging the gas stream from a line 16 disposed on the upper portion of the reactor to keep the solid particles (the solid catalyst and produced polymer) in a fluidizing state by this gas stream (fluidizing gas), whereby the fluidized bed (reaction system) 18 is formed.

The polymer particle produced by the polymerization of at least one olefin selected from ethylene and olefins having 3 to 20 carbon atoms in the fluidized bed 18 in this manner is withdrawn continuously or intermittently from the reactor through a discharge line 10 and then supplied to the ligand decomposing step as will be described later.

On the other hand, the gas discharged from the reactor 11 through the line 16 contains the unreacted polymerizable monomer and saturated aliphatic hydrocarbon and the like and is typically circulated as a circulating gas to the reactor 11 through the supply port 9 after cooling.

The fluidizing gas consisting of the polymerizable monomer and the circulating gas is introduced from the supply port 9 to the reactor 11 as aforementioned and passed through the fluidized-bed 18 at such a flow rate that the fluidized bed 18 can be kept in a fluidizing state by the gas. Specifically, the flow rate of the gas introduced from the supply port 9 is about 3 $U_{mf}$ to 50 $U_{mf}$ and preferably about 5 $U_{mf}$ to 30 $U_{mf}$, where $U_{mf}$ is the minimum fluidizing rate of the fluidized bed. It is possible to stir the fluidized bed 18 mechanically, for example, using various stirrers such as an anchor type stirrer, screw type stirrer and ribbon type stirrer.

The polymerization step may be divided into two or more stages differing in reaction condition from each other to carry out the polymerization. Next, the polymerization step in the case of carrying out the polymerization in two or more stages will be explained in detail with reference to FIG. 2, where the ligand removing step is also omitted in the FIG. 2.

In the case of carrying out the polymerization in two or more stages, for example, in the case of carrying out the polymerization is carried out in a multistage vapor phase polymerization apparatus having two vapor phase fluidized-bed reactors which are serially connected, the polymerization is conducted as follows.

Figure 2:
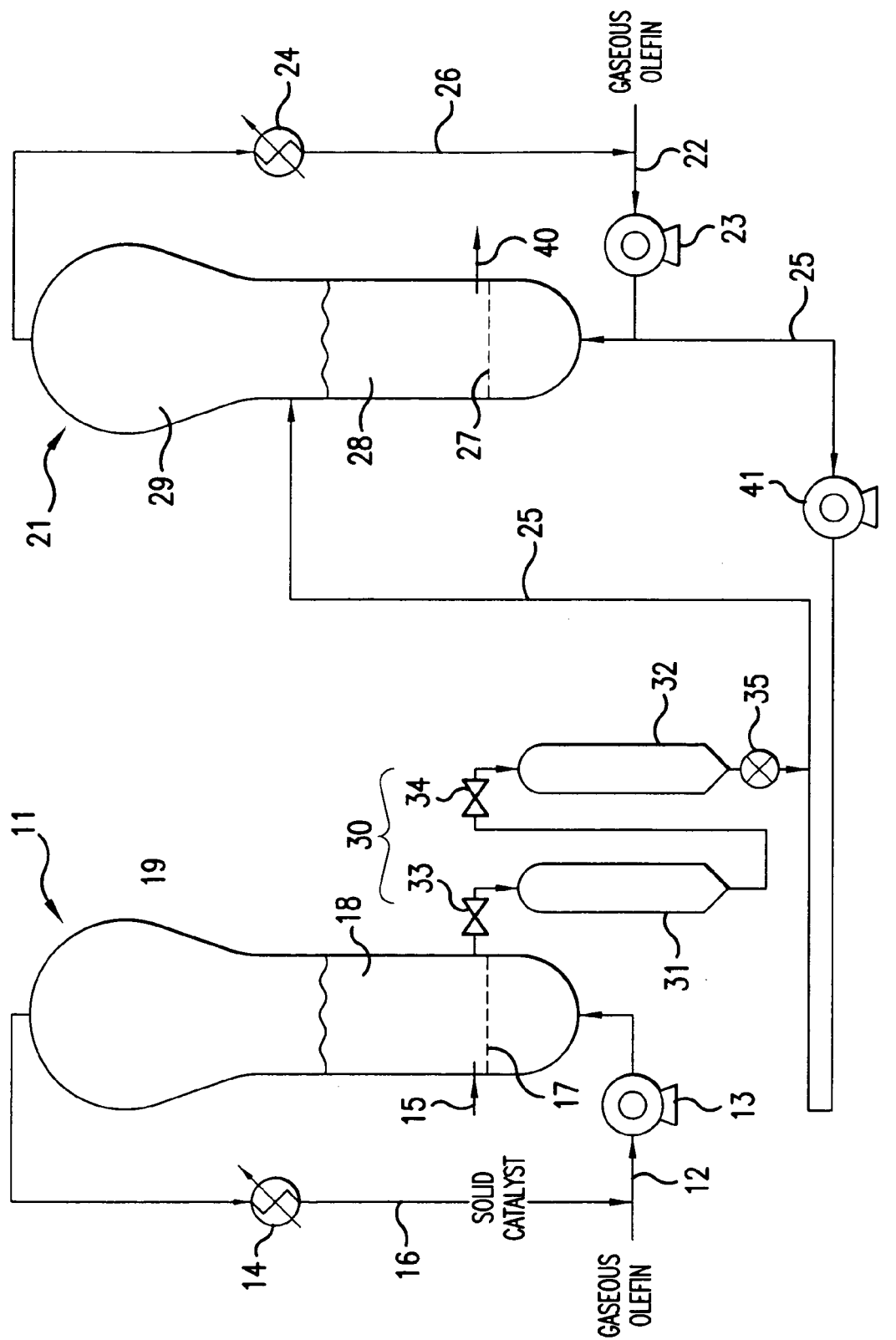
FIG. 2 is an explanatory view showing the case of carrying out a polymerization step in two stages.

In the multistage vapor phase polymerization apparatus, a first fluidized-bed reactor 21 is connected serially to a second fluidized-bed reactor 21 as shown in, for example, FIG. 2.

Specifically, it is so designed that the catalyst is supplied from a supply line 15 and also, gas (fluidizing gas) containing a gaseous olefin (polymerizable monomers) and the saturated aliphatic hydrocarbon is supplied from the bottom of the first fluidized-bed reactor 11 from a supply line 12 through a blower 13. The supplied fluidized-bed gas is blown into a fluidized-bed 18 through a diffusing plate 17 made of a perforated plate or the like disposed in the vicinity of the bottom of the first fluidized-bed reactor 11 and discharged from the upper part of the fluidized-bed reactor 11, and thus the fluidizing gas passes through the inside of the fluidized-bed reactor. The solid particles (the solid catalyst and the produced polymer) is kept in a fluidizing state by the gas flow of the gas passing through the inside of the fluidized-bed reactor 11, whereby the fluidized bed 18 is formed.

Then, the produced polymer particle is withdrawn continuously or intermittently and subjected to solid-vapor separation using solid-vapor separators 31 and 32. At this time, valves 33 and 34 are properly opened and shut under control. The polymer particle withdrawn in this manner is discharged in a transport line 25 by the action of the valve 35 and fed to the second fluidized-bed reactor 21 through the transport line 25.

Also, the unreacted gaseous olefin, saturated aliphatic hydrocarbon and the like which have passed through the fluidized bed 18 are decelerated in its flow rate in a decelerating region 19 disposed on the upper part of the first fluidized-bed reactor 11 and discharged out of the first fluidized-bed reactor 11 through a gas discharge port disposed on the upper part of the first fluidized-bed reactor 11.

The unreacted gaseous olefin, saturated aliphatic hydrocarbon and the like discharged from the first fluidized-bed reactor 11 are cooled in a heat exchanger (cooling unit) 14 through a circulating line 16, connected in the supply line 12 and supplied continuously again to the inside of the fluidized bed 18 in the first fluidized-bed reactor 11 by a blower 13. In the heat exchanger 14, the circulating gas is typically cooled to a temperature close to the dew point of the gas. The dew point of the gas means the temperature at which a liquid condensate starts. When the circulating gas is cooled to a temperature lower than the dew point and supplied to the fluidized bed 18, reaction heat can be removed by the latent heat of vaporization of the liquid condensate to thereby improve heat-removal efficiency in the fluidized bed 18. It should be noted that when circulating the circulating gas in the fluidized-bed reactor 11, a part of the circulating gas may be purged from an optional place of the circulating line 16.

On the other hand, the polymer particles withdrawn from a discharge line 30 of the first fluidized-bed reactor 11 through the solid-vapor separators 31 and 32 are fed to the second fluidized-bed reactor 21 through the transport line 25. The transport line 25 is branched from the supply line 22 and the other end of the transport line 25 is connected to the upper side of the second fluidized-bed reactor 21. Through the transport line 25, the pressure of the gas containing the olefins and the saturated aliphatic hydrocarbon fed from the supply line 22 is raised by a pressure-rise means such as a centrifugal blower 41, also the polymer particles withdrawn from the first fluidized-bed reactor 11 is made to be entrained in this gas to transport the polymer particles and then introduced into the second fluidized-bed reactor 21. Also, a new gaseous olefin (polymerizable monomer) and saturated aliphatic hydrocarbon are supplied to the second fluidized-bed reactor 21 from the supply line 22 through a blower 23 by the transport line 25 and at the same time, they also supplied as a fluidizing gas to the bottom of the second fluidized-bed reactor 21. It should be noted that although a new catalyst is not supplied to the second fluidized-bed reactor 21 in general, a new solid catalyst may be supplied to a desired place of the fluidized-bed reactor through, for example, the transport line 25 according to the need.

The fluidizing gas supplied from the bottom of the second fluidized-bed reactor 21 is blown into a fluidized bed 28 through a diffusing plate 27 made of a perforated plate or the like disposed in the vicinity of the bottom of the second fluidized-bed reactor 21 and discharged from the upper part of the fluidized-bed reactor 21, and thus passed through the fluidized-bed reactor 21. The gas stream of the gas passing through the fluidized-bed reactor 21 keeps the solid particles (the aforementioned polymer particles and the produced polymer) in a fluidizing state to thereby form the fluidized bed 28. At this time, a copolymerization reaction is run in the fluidized bed 28.

Then, the polymer particle obtained in the second fluidized-bed reactor 21 is withdrawn continuously or intermittently from a discharge line 40 and supplied to the ligand removing step as will be described later.

Also, the unreacted gaseous olefin, saturated aliphatic hydrocarbon and the like which have passed through the fluidized bed 28 are decelerated in its flow rate in a decelerating region 29 disposed on the upper part of the second fluidized-bed reactor 21 and discharged out of the second fluidized-bed reactor 21 through a gas discharge port disposed on the upper part of the second fluidized-bed reactor 21.

The unreacted gaseous olefins, saturated aliphatic hydrocarbon and the like discharged from the second fluidized-bed reactor 21 are cooled in a heat exchanger (cooling unit) 24 through a circulating line 26, connected in the supply line 22 and supplied continuously again to the inside of the fluidized bed 28 in the second fluidized-bed reactor 21 by a blower 23. In the heat exchanger 24, the circulating gas is typically cooled to a temperature close to the dew point of the gas. When the circulating gas is cooled to a temperature lower than the dew point and supplied to the fluidized bed 28, reaction heat can be removed by the latent heat of vaporization of the liquid condensate to thereby improve heat-removal efficiency in the fluidized bed 28. It should be noted that when circulating the circulating gas to the fluidized-bed reactor 21, a part of the circulating gas may be purged from an optional place of the circulating line 26.

In the first fluidized-bed reactor 11, as aforementioned, the fluidizing gas is passed through the fluidized-bed 18 at such a flow rate that the fluidized bed 18 can be kept in a fluidizing state. In the second fluidized-bed reactor 21, the fluidizing gas is passed through the fluidized-bed 28 at such a flow rate that the fluidized bed 28 can be kept in a fluidizing state.

Specifically, the flow rate of the gas introduced from the bottom of each reactor through the supply lines 12 and 22 is about 3 $U_{mf}$ to 50 $U_{mf}$ and preferably about 5 $U_{mf}$ to 30 $U_{mf}$, where $U_{mf}$ is the minimum fluidizing rate of the fluidized bed. It is possible to stir the fluidized bed 18 mechanically, for example, using various stirrers such as an anchor type stirrer, screw type stirrer and ribbon type stirrer.

Although the above explanations were furnished as to a multistage vapor phase polymerization apparatus consisting of two fluidized-bed reactors, namely the first fluidized-bed reactor 11 and the second fluidized-bed reactor 21 which are serially connected to each other, even a multistage vapor phase apparatus consisting of three or more fluidized-bed reactors can be structured in the same manner.

In the fluidized bed kept in a fluidizing state as aforementioned in the present invention, the polymerization monomers supplied to the reactor, specifically, at least one olefin selected from ethylene and α-olefins having 3 to 20 carbon atoms is polymerized.

In the present invention, polyenes and the like may be optionally copolymerized together with the above olefins. For example, conjugate dienes such as butadiene and isoprene or non-conjugate dienes such as 1,4-hexadiene, dicyclopentadiene and 5-vinyl-2-norbornene may be copolymerized.

In the polymerization step, no particular limitation is imposed on the amount of each monomer to be supplied in the case of copolymerizing two or more monomers selected from ethylene and α-olefins having 3 to 20 carbon atoms. However, in the case of copolymerizing, for example, ethylene with an α-olefin having 3 to 20 carbon atoms, the α-olefin is supplied in an amount of typically 0.015 to 0.15 mole and preferably 0.02 to 0.08 mole based on one mole of ethylene.

In the present invention, the saturated aliphatic hydrocarbon in a vapor-liquid mixed state is introduced together with the polymerizable monomer from the bottom of the reactor to conduct the above reaction. Specific examples of such a saturated aliphatic hydrocarbon include saturated aliphatic hydrocarbons having 2 to 10 carbon atoms such as ethane, propane, n-butane, i-butane, n-pentane, i-pentane, hexane, heptane, octane, nonane, decane, 2,2-dimethylpropane, 2,2-dimethylbutane, 2,3-dimethylbutane, 2,2,3-trimethylbutane, 2-methylpentane, 3-methylpentane, 2,2-dimethylpentane, 3,3-dimethylpentane, 2,3-dimethylpentane, 2,4-dimethylpentane, 2-methylhexane, 3-methylhexane, 4-methylhexane, 2,3-dimethylhexane, cyclopentane, cyclohexane, methylcyclopentane and dimethylcyclopentane. Among these, those having 3 to 8 carbon atoms are preferable.

In the present invention, a process may be adopted in which using two or more saturated aliphatic hydrocarbons, at least one saturated aliphatic hydrocarbon is introduced in a vapor-liquid mixed state into a polymerizing vessel and the other saturated aliphatic hydrocarbon is introduced in a gaseous state into the polymerizing vessel. In this case, as the saturated aliphatic hydrocarbon to be introduced in a gaseous state into the reactor, ethane, propane, n-butane, i-butane, i-pentane, n-pentane, hexane or the like is preferable and these may be used in combination.

Here, the gaseous saturated aliphatic hydrocarbon means that substantially all the saturated aliphatic hydrocarbon exists as a gas phase, specifically 99% or more of 100% of the total saturated aliphatic hydrocarbon exists as a gaseous phase, namely, means that the vapor fraction is 0.99 or more. The ratio of the existence of the gas phase can be obtained from the vapor-liquid equilibrium constant $K_i$ based on the method of Soave-Redlich-Kwong reported in Chem. Eng. Sci., 27, 1197 (1972).

As the saturated aliphatic hydrocarbon to be introduced in a vapor-liquid mixed state into the reactor, those which have a higher boiling point than the saturated aliphatic hydrocarbon to be introduced in a gaseous state into the reactor and are easily condensed when cooled in a heat exchanger or the like are selected. As the saturated aliphatic hydrocarbon, for example, i-pentane, n-pentane, hexane or heptane is preferable and these hydrocarbons may be used in combination.

In the present invention, when using the saturated aliphatic hydrocarbon to be introduced in a vapor-liquid mixed state in combination with the saturated aliphatic hydrocarbon to be introduced in a gaseous state, especially, a combination of ethane and i-pentane or a combination of ethane and hexane is preferably used.

In the composition (that is, substantially the composition of the gas of the fluidized-bed reaction system) discharged from the reactor, the concentration of the saturated aliphatic hydrocarbon in the gas is typically about 2 to 30 mol % and preferably about 5 to 20 mol % though it differs depending on the number of carbon atoms in the saturated aliphatic hydrocarbon, polymerization temperature, the flow rate of the fluidizing gas and the like.

Also, when using the saturated aliphatic hydrocarbon to be introduced in a vapor-liquid mixed state in combination with the saturated aliphatic hydrocarbon to be introduced in a gaseous state, it is preferable that the concentration (saturated aliphatic hydrocarbon to be introduced in a gaseous state)/(saturated aliphatic hydrocarbon to be introduced in a vapor-liquid mixed state) in the discharged gas be 60 to 100% by weight.

Although the saturated aliphatic hydrocarbon is introduced together with the polymerizable monomer into the reactor from the supply line through the supply port of the bottom of the reactor in usual as aforementioned, these hydrocarbons may be introduced from the same place or separately from different places.

The polymerization of ethylene and at least one α-olefin selected from α-olefins having 3 to 20 carbon atoms which polymerization is carried out in the presence of the saturated aliphatic hydrocarbon on the fluidized-bed is desirably carried out under the condition of a polymerization pressure of typically 0.1 to 10 MPa and preferably 0.2 to 4 MPa at a polymerization temperature of typically 20 to 130° C., preferably 50 to 120° C. and more preferably 70 to 110° C. though these conditions differ depending on the type and proportion of olefin to be polymerized, the proportion of the saturated aliphatic hydrocarbon and the fluid condition of the fluidized bed.

The above copolymerization may be carried out in the presence of a molecular weight regulator such as hydrogen molecule according to the need and the regulator may be supplied from a desired place.

The saturated aliphatic hydrocarbon as aforementioned is a non-polymerizable hydrocarbon. When it is once supplied to the reactor, it is not consumed by the polymerization reaction, but is typically withdrawn from the discharge line together with the unreacted polymerizable monomers and circulated as the fluidizing gas to the reactor.

Specifically, this discharged gas may contain the saturated aliphatic hydrocarbons in a total amount of 0.8 to 80 mol %, however, this amount differs depending on the number of carbon atoms in the saturated aliphatic hydrocarbon.

The gas discharged from the reactor is typically introduced into a heat exchanger and cooled therein to remove polymerization heat and then circulated as the circulating gas to the reactor from the supply port. The saturated aliphatic hydrocarbon cooled in the heat exchanger at this time is circulated in a vapor-liquid mixed state to the reaction system. When the discharge gas is circulated to the reactor in this manner, a part of the discharge gas may be purged.

In the present invention, the molecular weight of the resulting olefinic polymer may be adjusted by changing the polymerization condition such as polymerization temperature or may be adjusted by controlling the amount of hydrogen molecule (molecular weight regulator) to be used.

As aforementioned, the gaseous saturated aliphatic hydrocarbon and the saturated aliphatic hydrocarbon in a vapor-liquid mixed state are introduced into the reactor to polymerize ethylene and at least one α-olefin selected from α-olefins having 3 to 20 carbon atoms, so that low-molecular weight components in the produced polymers are removed by these saturated aliphatic hydrocarbons, whereby a polymer having the greatly reduced content of n-decane-soluble components can be obtained. Also, the polymerization heat of the fluidized bed can be removed by the latent heat of the saturated aliphatic hydrocarbon introduced in a vapor-liquid mixed state.

In the present invention, the olefinic polymer fulfilling the properties as mentioned above is obtained in the case of using a metallocene type catalyst though the polymerization as aforementioned may be carried out using a wide range of catalysts known as catalysts for ethylene polymerization such as Ziegler type catalysts, Philip type chromium oxide catalysts and metallocene type catalysts. Specific examples of the metallocene type catalysts preferably used in the present invention include:

(A) metallocene compounds of transition metals selected from the IVB group in the periodic table; and (B) (B-1) organic aluminum oxy compounds;
(B-2) organic aluminum compounds; and
(B-3) at least one compound selected from compounds which react with the metallocene compound (A) to form an ion pair.

((A) Metallocene Compound)

The metallocene compound (A) of transition metals selected from the IVB group in the periodic table are specifically represented by the following formula (i).

$$ML_x \quad (i)$$

wherein M represents a transition metal selected from Zr, Ti, Hf, V, Nb, Ta and Cr, L represents a ligand coordinating with the transition metal wherein at least one L is a ligand having a cyclopentadienyl structure and L other than the ligand having a cyclopentadienyl structure is a hydrogen atom, a halogen atom, a hydrocarbon group having 1 to 12 carbon atoms, an alkoxy group, an aryloxy group, a trialkylsilyl group or a $SO_3R$ group (where R is a $C_1$–$C_8$ hydrocarbon group which may have a substituent such as a halogen) and x represents the atomic value of the transition metal.

As the ligand having a cyclopentadienyl structure, alkyl substituted cyclopentadienyl groups such as a cyclopentadienyl group, methylcyclopentadienyl group, dimethylcyclopentadienyl group, trimethylcyclopentadienyl group, tetramethylcyclopentadienyl group, pentamethylcyclopentadienyl group, ethylcyclopentadienyl group, methylethylcyclopentadienyl group, propylcyclopentadienyl group, methylpropylcyclopentadienyl group, butylcyclopentadienyl group, methylbutylcyclopentadienyl group and hexylcyclopentadienyl group, an indenyl group and 4,5,6,7-tetrahydroindenyl group and a fluorenyl group may be exemplified. These groups may be substituted with a halogen atom, trialkylsilyl group or the like.

Among these groups, alkyl substituted cyclopentadienyl group is particularly preferable.

Specific examples of the ligand other than the ligand having a cyclopentadienyl structure are as follows. Examples of the halogen include fluorine, chlorine, bromine and iodine. Examples of the hydrocarbon group having 1 to 12 carbon atoms include alkyl groups such as methyl group, ethyl group, propyl group, isopropyl group and butyl group, cycloalkyl groups such as cyclopentyl group and cyclohexyl group, aryl groups such as phenyl group and tolyl group and aralkyl groups such as benzyl group and neophyl group. Examples of the alkoxy group include methoxy group, ethoxy group and butoxy group. Examples of the aryloxy group include phenoxy group. Examples of the $SO_3R$ group include p-toluene sulfonate group, methane sulfonate group and trifluoromethane sulfonate group.

When the compound represented by the above general formula has two or more groups having a cyclopentadienyl structure, two groups of those groups having a cyclopentadienyl structure may be bonded with each other through an alkylene group such as ethylene or propylene, a substituted alkylene group such as isopropylidene or diphenylmethylene, a silylene group or substituted silylene group such as dimethylsilylene group, diphenylsilylene group or methylphenylsilylene group.

The metallocene compounds containing such a ligand having a cyclopentadienyl structure are represented more specifically by the following formula (ii) when the valence of the transition metal is, for example, 4.

$$R^2{}_k R^3{}_l R^4{}_m R^5{}_n M \quad \text{(ii)}$$

wherein M represents the foregoing transition metal, $R^2$ represents a group (ligand) having a cyclopentadienyl structure, $R^3$, $R^4$ and $R^5$ represent groups having a cyclopentadienyl structure or other groups as aforementioned, k denotes an integer of 1 or more and k+l+m+n=4.

In the present invention, metallocene compounds represented by $R^2{}_k R^3{}_l R^4{}_m R^5{}_n M$ in which at least two, for example, $R^2$ and $R^3$, among $R^2$, $R^3$, $R^4$ and $R^5$ are groups (ligands) having a cyclopentadienyl structure are preferably used. These groups having a cyclopentadienyl structure may be bonded with each other through an alkylene group, substituted alkylene group, silylene group or substituted silylene group.

Examples of the metallocene compounds as aforementioned, when, specifically, M is zirconium, include bis(cyclopentadienyl)zirconium dichloride, bis(cyclopentadienyl)zirconium dibromide, bis(cyclopentadienyl) dimethylzirconium, bis(cyclopentadienyl) diphenylzirconium, bis(cyclopentadienyl) dibenzylzirconium, bis(cyclopentadienyl)zirconium bis(methanesulfonate), bis(cyclopentadienyl)zirconium bis(p-toluenesulfonate), bis(cyclopentadienyl)zirconium bis(trifluoromethanesulfonate), bis(methylcyclopentadienyl)zirconium dichloride, bis(dimethylcyclopentadienyl)zirconium dichloride, bis(ethylcyclopentadienyl)zirconium dichloride, bis(methylethylcyclopentadienyl)zirconium dichloride, bis(propylcyclopentadienyl)zirconium dichloride, bis(methylpropylcyclopentadienyl)zirconium dichloride, bis(butylcyclopentadienyl)zirconium dichloride, bis(methylbutylcyclopentadienyl)zirconium dichloride, bis(trimethylcyclopentadienyl)zirconium dichloride, bis(indenyl)zirconium dichloride, bis(indenyl)zirconium dibromide, bis(4,5,6,7-tetrahydroindenyl)zirconium dichloride, bis(fluorenyl)zirconium dichloride, ethylenebis(indenyl)zirconium dichloride, ethylenebis(indenyl)zirconium dibromide, ethylenebis(indenyl)dimethylzirconium, isopropylidene(cyclopentadienyl-fluorenyl)zirconium dichloride, isopropylidene(cyclopentadienyl-methylcyclopentadienyl) zirconium dichloride, dimethyl silylenebis(cyclopentadienyl)zirconium dichloride, dimethylsilylenebis(methylcyclopentadienyl)zirconium dichloride, dimethylsilylenebis(dimethylcyclopentadienyl)zirconium dichloride, dimethylsilylenebis(indenyl) zirconium dichloride, dimethylsilylenebis(2-methylindenyl)zirconium dichloride, dimethylsilylenebis(2-methyl-4-isopropylindenyl)zirconium dichloride, dimethylsilylene(cyclopentadienyl-fluorenyl) zirconium dichloride, diphenylsilylenebis(indenyl) zirconium dichloride and methylphenylsilylenebis(indenyl)zirconium dichloride.

It should be noted that in the above examples, the di-substituted form of a cyclopentadienyl ring includes 1,2- and 1,3-disubstituted forms and the tri-substitution form of a cyclopentadienyl ring includes 1,2,3- and 1,2,4-trisubstitution forms. Also, the alkyl groups such as propyl and butyl include isomers such as n-, i-, sec- and tert-isomers.

Compounds obtained by substituting zirconium with titanium, hafnium, vanadium, niobium, tantalum or chromium in the metallocene compounds as mentioned above may be exemplified.

In the present invention, as the metallocene compound (A), zirconium metallocene compounds having a ligand containing at least two cyclopentadienyl structures are preferably used.

These metallocene compounds (A) may be used alone or in combination of two or more.

((B-1) Organic Aluminum Oxy Compound)

The (B-1) organic aluminum oxy compound may be a conventionally known benzene-soluble aluminoxane and also a benzene-insoluble organic aluminum oxy compound as disclosed in the publication of Japanese Patent Application Laid-Open No. 2-276807.

This aluminoxane may contain a small amount of organic metal components. Also, analuminoxane obtained by decomposing solvents or unreacted organic aluminum compounds from a recovered aluminoxane solution by distillation may be used by re-dissolving it in a solvent.

Given as specific examples of the organic aluminum compound used in the production of aluminoxane are those described later as the organic aluminum compound (B-2). These compounds may be used in combination of two or more of them.

Among these compounds, a trialkylaluminum and tricycloalkylaluminum are particularly preferable.

Also, the benzene-insoluble organic aluminum oxy compound contains an aluminum component soluble in benzene at 60° C. in an amount of 10% or less, preferably 5% or less and particularly preferably 2% or less as an Al atom and is insoluble or hardly soluble in benzene.

The solubility of such an organic aluminum oxy compound in benzene is determined in the following manner. Specifically, the organic aluminum oxy compound of 100 mmol of Al is suspended in 100 ml of benzene and then mixed at 60° C. for 6 hours with stirring. The suspension is subjected to filtration using a jacketed G-5 glass filter at 60° C. under heating and the solid part separated on the filter is washed with 50 ml of benzene at 60° C. four times. Then, the existing amount (x mmol) of Al atoms present in the entire filtrates is measured (x %).

The organic aluminum oxy compound (B-1) may be used alone or in combination of two or more.

((B-2) Organic Aluminum Compound)

The organic aluminum compound (B-2) is represented by, for example, the following formula (iii).

$$R^1{}_n Al X_{3-n} \quad \text{(iii)}$$

wherein the formula (iii), $R^1$ represents a hydrocarbon group having 1 to 12 carbon atoms, X represents a halogen atom or hydrogen atom and n denotes a number from 1 to 3.

In the above formula (iii), $R^1$ represents a hydrocarbon group having 1 to 12 carbon atoms, for example, an alkyl group, cycloalkyl group or aryl group and specifically methyl group, ethyl group, n-propyl group, isopropyl group, isobutyl group, pentyl group, hexyl group, octyl group, cyclopentyl group, cyclohexyl group, phenyl group and tolyl group.

Specific examples of the organic aluminum compound (B-2) like this may include trialkylaluminums such as trimethylaluminum, triethylaluminum, triisopropylaluminum and triisobutylaluminum; alkenylaluminums such as isoprnylaluminum; dialkylaluminum halides such as dimethylaluminum chloride, diethylaluminum chloride, diisopropylaluminum chloride and diisobutylaluminum chloride; alkylaluminum sesquihalides such as methylaluminum sesquichloride, ethylaluminum sesquichloride and isopropylaluminumsesquichloride; alkylaluminumdihalides such as methylaluminum dichloride, ethylaluminum dichloride and isopropylaluminum dichloride; and alkylaluminum hydrides such as diethylaluminum hydride and diisobutylaluminum hydride.

Also, as the organic aluminum compound (B-2), compounds as shown by the following formula (iv) may be used.

$$R^1{}_n AlY_{3-n} \qquad (iv)$$

wherein the formula (iv) $R^1$ is the same as above, Y represents an $-OR^2$ group, an $-OSiR^3{}_3$ group, an $-OAlR^4{}_2$ group, a $-NR^5{}_2$ group, a $-SiR^6{}_3$ group or a $-N(R^7)AlR^8{}_2$ group, n denotes a number of 1 to 2, $R^2$, $R^3$, $R^4$ and $R^8$ respectively represent methyl group, ethyl group, isopropyl group, isobutyl group, cyclohexyl group or phenyl group, $R^5$ represents a hydrogen atom, methyl group, ethyl group, isopropyl group, phenyl group, trimethylsilyl group or the like and $R^6$ and $R^7$ respectively represent methyl group or ethyl group.

Among these compounds, a trialkylaluminum is preferable and triisobutyl aluminum is particularly preferable.

These organic aluminum compounds (B-2) may be used alone or in combination of two or more.

((B-3) Compounds which react with the metallocene compound (A) to form an ion pair)

Examples of the compound (B-3) which reacts with the metallocene compound (A) to form an ion pair may include Lewis acids, ionic compounds and carborane compounds described in each publication of Japanese Patent Application Laid-Open Nos. 1-501950, 1-502036, 3-179005, 3-179006, 3-207703 and 3-207704 and in the specification of U.S. Pat. No. 547,718.

Examples of the Lewis acid include triphenylboron, tris (4-fluorophenyl)boron, tris(p-tolyl)boron, tris(o-tolyl)boron, tris(3,5-dimethylphenyl)boron, tris(pentafluorophenyl)boron, $MgCl_2$, $Al_2O_3$ and $SiO_2$—$Al_2O_3$.

Examples of the ionic compound include triphenylcarbenium tetrakis(pentafluorophenyl) borate, tri-n-butylammonium tetrakis(pentafluorophenyl) borate, N,N-dimethylaniliniumtetrakis(pentafluorophenyl) borate and ferroceniumtetra(pentafluorophenyl) borate.

Examples of the carborane compound include dodecaborane, 1-carbaundecaborane, bis-n-butylammonium (1-carbedodeca) borate, tri-n-butylammonium (7,8-dicarbaundeca) borate and tri-n-butylammonium (tridecahydride-7-carbaundeca) borate.

These compounds may be used alone or in combination of two or more.

In the present invention, at least one compound selected from the components (B-1), (B-2) and (B-3) as aforementioned is used as the co-catalyst component (B) and these components may be also used in combination adequately. It is desirable to use at least the component (B-1) or (B-2) among these components as the co-catalyst component (B).

In the present invention, it is desirable to use a catalyst containing the aforementioned metallocene catalyst component and co-catalyst component and typically, it is preferred to use this catalyst as a supported-on-a-support type catalyst (solid catalyst) made by contacting these catalyst components with a support compound in particle form.

As the support compound, a granular or particulate solid having a particle diameter of 10 to 300 μm and preferably 20 to 200 μm is used. This support preferably has a specific surface area of typically 50 to 1000 m²/g and a pore volume of 0.3 to 2.5 cm³/g.

As such a support, porous inorganic oxides are preferably used. Specifically, $SiO_2$, $Al_2O_3$, MgO, $ZrO_2$, $TiO_2$, $B_2O_3$, CaO, ZnO, BaO, $ThO_2$ and the like or mixtures of these compounds, for example, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO and the like are used. Among these compounds, those having $SiO_2$ and/or $Al_2O_3$ as their major components are preferable.

The above inorganic oxide may contain carbonates, sulfates, nitrates and oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, Al $(NO_3)_3$, $Na_2O$, $K_2O$ and $Li_2O$ in a small amount.

As the support, organic compounds may be also used. For example, (co)polymers produced using olefins having 2 to 14 carbon atoms such as ethylene, propylene, 1-butene and 4-methyl-1-pentene as the major components or polymers or copolymers produced using vinylcyclohexene and styrene as the major component may be used.

It is desirable that the contact of the support and the above each component is carried out at a temperature of typically −50 to 150° C. and preferably −20 to 120° C. for 1 minute to 50 hours and preferably 10 minutes to 25 hours.

In the solid catalyst prepared in the above manner, the metallocene compound (A) is preferably supported in an amount of $5 \times 10^{-6}$ to $5 \times 10^{-4}$ gram atom and preferably $10^{-5}$ to $2 \times 10^{-4}$ gram atom as a transition metal per 1 g of the support and the component (B) is preferably supported in an amount of $10^{-3}$ to $5 \times 10^{-2}$ gram atom and preferably $2 \times 10^{-3}$ to $2 \times 10^{-2}$ gram atom as an aluminum atom or a boron atom per 1 g of the support.

Further, in the present invention, although the solid catalyst as aforementioned may be used for polymerization as it is, it may be used in the form of a pre-polymerized catalyst formed by pre-polymerizing the olefin thereon.

In the present invention, the solid catalyst or the pre-polymerized catalyst is preferably used in an amount of typically $10^{-8}$ to $10^{-3}$ gram atom/litter and further $10^{-7}$ to $10^{-4}$ gram atom/l in terms of transition metal/litter (polymerization volume).

In addition, although the component (B) may be used or not when using the pre-polymerized catalyst, it may be used, according to the need, in an amount of 5 to 300, preferably 10 to 200 and more preferably 15 to 150 in terms of the atomic ratio of aluminum or boron (Al/transition metal or B/transition metal) to the transition metal in the polymerization system.

The density (ASTM D150E) of the olefinic polymer obtained in the above manner is preferably 0.865 to 0.930 g/cm³ and more preferably 0.880 to 0.930 g/cm³.

When the olefinic polymer is an ethylene/α-olefin copolymer, the copolymer preferably contains the structural unit derived from ethylene in an amount of 87.0 to 97.6 mol % and preferably 90.0 to 96.8 mol % and the structural unit derived from α-olefins having 3 to 10 carbon atoms in an amount of 13.0 to 2.4 mol % and preferably 10.0 to 3.2 mol %.

It should be noted that the olefinic polymer may contain the unit derived from polyenes and the like in an amount of 10% by weight or less, preferably 5% by weight or less and particularly preferably 3% by weight or less.

(Ligand Removing Step)

The polymer particle ((co)polymer) withdrawn from the discharge lines (10, 40) in the polymerization step as mentioned above is fed to the ligand removing step where the ligand in the polymer particle is removed.

The ligand removing step comprises (1) a step (catalyst decomposing step) of decomposing a catalyst by bringing the (co)polymer obtained in the above polymerization step into contact with a ligand-remover to decompose catalyst to metal and ligand in the (co)polymer and (2) a step (ligand eliminating step) of heating the above (co)polymer which has been made to be in contact with the ligand-remover and eliminating the ligand liberated during the above-mentioned catalyst decomposing step from the (co)polymer.

(Ligand-remover)

Given as examples of the ligand-remover used in the catalyst decomposing step are water, oxygen, alcohols, alkylene oxides and peroxides. Specific examples of the ligand-remover include alcohols having 10 or less carbon atoms such as mono-alcohols, e.g., methanol, ethanol, propanol, isopropanol, butanol, pentanol, hexanol, heptanol, octanol, cyclopentanol and cyclohexanol and dialcohols, e.g., ethylene glycol; alkylene oxides such as ethylene oxide, propylene oxide, trimethylene oxide, tetrahydrofuran and tetrahydropyran; and peroxides such as propylene peroxide and butene peroxide.

Among these compounds, water and alcohols having 5 or less carbon atoms are preferable and water is particularly preferable.

As a method of bringing the (co)polymer into contact with the ligand-remover, there is a method in which the (co)polymer is brought into contact with a gas stream containing the ligand-remover. In this case, a powder of the (co)polymer is allowed to pass through a vessel while introducing gas containing the ligand-remover into the vessel.

The average particle diameter of the powder of the (co)polymer when the (co)polymer is brought into contact with the ligand-remover is in a range from typically 50 to 5,000 µm, preferably 80 to 3,000 µm and more preferably 100 to 2,000 µm. Examples of the gas for dilution of the ligand-remover include inert gases such as nitrogen gas and argon gas. In the ligand-remover-containing gas, a vapor of the ligand-remover is typically contained. The proportion of the ligand-remover in the ligand-remover-containing gas is in a range from typically 0.1% by weight to 40% by weight, preferably 0.5% by weight to 20% by weight and particularly preferably 1% by weight to 10% by weight.

The space tower velocity of the ligand-remover-containing gas is in a range from typically 0.01 to 20 cm/sec, preferably 0.1 to 10 cm/sec and particularly preferably 0.5 to 5 cm/sec. The space tower velocity is calculated based on the temperature and pressure of the ligand-remover-containing gas at the gas exit port of an apparatus used when bringing the (co)polymer into contact with the ligand-remover and the sectional area of the apparatus.

The temperature used when bringing the (co)polymer into contact with the ligand-remover is typically more than the crystallization temperature of the (co)polymer and less than the decomposition temperature of the (co)polymer and, specifically, in a range from 100 to 300° C. and preferably 100 to 280° C. when the crystallinity of the (co)polymer is 40% or more. When the crystallinity of the (co)polymer is less than 40%, the temperature is equal to or more than the temperature of the melting point of the (co)polymer minus 15° C., and less than the decomposition temperature of the (co)polymer and specifically in a range from 85 to 300° C. and preferably 90 to 280° C.

It should be noted that the degree ($X_c$) of crystallization of the (co)polymer is measured by the following method. Specifically, the (co)polymer is pre-heated at 190° C. for 7 minutes and then pressed at 9.8 MPa for 2 minutes. Thereafter, the (co)polymer is cooled under the condition of 20° C. and 9.8 MPa to produce a 5-mm-thick pressed sheet. About 5 mg of a test piece (sample) cut from the above pressed sheet is placed in an aluminum pan. Using DSC-II (manufactured by Perkin Elmer Inc.), measurement is made from room temperature to 150° C. with increasing the temperature by 10° C./min to obtain an endothermic curve. The endothermic curve of the sample is converted into a curve of calorie of melting using the endothermic curve area of indium which has been separately measured. The point at 35° C. on the endothermic curve of the sample is connected to the point at which the heat absorption peak disappeared completely to make a base line. The value ($X_c=A/260$) obtained by dividing the calorie of melting (A (J/g)) from the measurement by the calorie of melting (260 (J/g)) of a 100% polyethylene crystal is expressed as the crystallinity.

The pressure when bringing the (co)polymer into contact with the ligand-remover is in a range of typically 0.0001 to 0.6 MPa, preferably 0.001 to 0.35 MPa and particularly preferably 0.01 to 0.25 MPa. The contact time (retention time) is typically 1 minute to 3 hours, preferably 2 minutes to 2 hours and particularly preferably 5 minutes to 1 hour.

The catalyst can be decomposed, so that the ligand having a high-boiling point can be converted into low-boiling point compounds by bringing the (co)polymer into contact with the ligand-remover as aforementioned. Also, the ligand is occasionally made odorless by only the decomposition depending on the type of ligand.

Next, the (co)polymer which has been brought into contact with the ligand-remover is heated to remove the decomposed ligand in the (co)polymer. As a method of eliminating the ligand by heating the (co)polymer which has been made to be in contact with the ligand-remover, there is, for example, the following methods.

(1) A method in which the (co)polymer is heated using a dryer such as a rotary drier, belt drier, flash drier, spray drier or puddle drier under a stream of inert gas.

(2) A method in which the (co)polymer is heated and melted using a single-screw or twin-screw extruder.

In the case of adopting the method (2), the heat-melted (co)polymer is pelletized and may be further subjected to any of the following steps (2-1) to (2-3).

(2-1) A step of bringing the pellet into contact with hot water.

(2-2) A step of bringing the pellet into contact with steam.

(2-3) A step of heating the pellet under a pressure of 0.001 to 0.098 MPa.

The heating temperature of the (co)polymer when carrying out the above method (1) is typically more than the crystallization temperature of the (co)polymer and less than the decomposition temperature of the (co)polymer or more than the crystallization temperature of the (co)polymer and lower than the melting point of the (co)polymer, and, specifically, in a range from 100 to 300° C. and preferably 100 to 280° C. when the crystallinity of the (co)polymer is 40% or more.

When the crystallinity of the (co)polymer is less than 40%, the temperature is the melting point of the (co)polymer –15° C. or more and less than the decomposition temperature of the (co)polymer or is the melting point of the (co)polymer −15° C. or more and less than the melting point of the (co)polymer, and is specifically in a range from 85 to 300° C. and preferably 90 to 280° C.

The pressure is in a range of typically 0.0001 to 0.6 MPa, preferably 0.001 to 0.35 MPa and particularly preferably 0.01 to 0.25 MPa. The heating time (retention time) is typically 1 minute to 3 hours, preferably 2 minutes to 2 hours and particularly preferably 5 minutes to 1 hour.

Examples of the inert gas include nitrogen gas, helium gas and argon gas. The gas flow rate in the drier is in a range from typically 0.01 to 20 cm/sec, preferably 0.1 to 10 cm/sec and particularly preferably 0.5 to 5 cm/sec.

When carrying out the above method (2), the heating temperature of the (co)polymer is the same as in the method (1). In the present invention, in the case of heating the (co)polymer at a temperature more than the melting point of the (co)polymer and less than the decomposition temperature of the (co)polymer in the ligand eliminating step, it is preferable to heat with applying shear stress to the (co)polymer. Examples of a method for applying shear stress to the (co)polymer include methods using a paddle drier or a single-screw or twin-screw extruder.

In the case of adopting the above method (2) in the present invention, the heat-melted (co)polymer is pelletized and may be subjected to any of the following steps (2-1) to (2-3).

As an apparatus which may be used when carrying out a step (2-1), there are a counter-current extracting tower, tank provided with a stirrer and multistage horizontal extracting vessel. As an apparatus which may be used when carrying out steps (2-2) and (2-3), there are a silo and hopper.

When carrying the above step (2-1), the temperature of the hot water is in a range from 35 to 200° C., preferably 40 to 180° C. and particularly preferably 45 to 150° C. The contact time is in a range from 1 to 900 minutes, preferably 5 to 600 minutes and particularly preferably 10 to 360 minutes.

In the step (2-2), similarly to the aforementioned ligand removing step, steam-containing gas is brought into contact with the (co)polymer. Examples of the steam-containing gas include inert gas and air which are the same as above.

The heating temperature of the (co)polymer when bringing the (co)polymer into contact with the steam-containing gas is typically more than the crystallization temperature of the (co)polymer and less than the decomposition temperature of the (co)polymer or more than the crystallization temperature of the (co)polymer and lower than the melting point of the (co)polymer, and, specifically, in a range from 100 to 300° C. and preferably 100 to 280° C. when the crystallinity of the (co)polymer is 40% or more.

When the crystallinity of the (co)polymer is less than 40%, the temperature is the melting point of the (co)polymer −15° C. or more and less than the decomposition temperature of the (co)polymer or is the melting point of the (co)polymer −15° C. or more and less than the melting point of the (co)polymer, and is specifically in a range from 85 to 300° C. and preferably 90 to 280° C.

The pressure is in a range of typically 0.0001 to 0.6 MPa, preferably 0.001 to 0.35 MPa and particularly preferably 0.01 to 0.25 MPa. The proportion of the steam in the steam-containing gas is in a range from typically 0.1% by weight to 40% by weight, preferably 0.5% by weight to 20% by weight and particularly preferably 1% by weight to 10% by weight.

The space tower velocity of the steam-containing gas is in a range of typically 0.01 to 20 cm/sec, preferably 0.1 to 10 cm/sec and particularly preferably 0.5 to 5 cm/sec. The contact time (retention time) is typically 0.5 to 30 hours, preferably 1 to 24 hours and particularly preferably 2 to 20 hours.

When carrying out the above step (2-3), the pressure is in a range from 0.001 to 0.100 MPa, preferably 0.007 to 0.098 MPa and particularly preferably 0.01 to 0.07 MPa. The temperature is 35 to 200° C., preferably 40 to 180° C. and particularly preferably 45 to 150° C. Also, the heating time is 0.5 to 30 hours, preferably 1 to 24 hours and particularly preferably 2 to 20 hours.

It is desirable that the average particle diameter of the (co)polymer pellet when carrying out the above steps (2-1) to (2-3) be in a range from typically 1 to 30 mm, preferably 3 to 20 mm and more preferably 5 to 15 mm.

Figure 3:
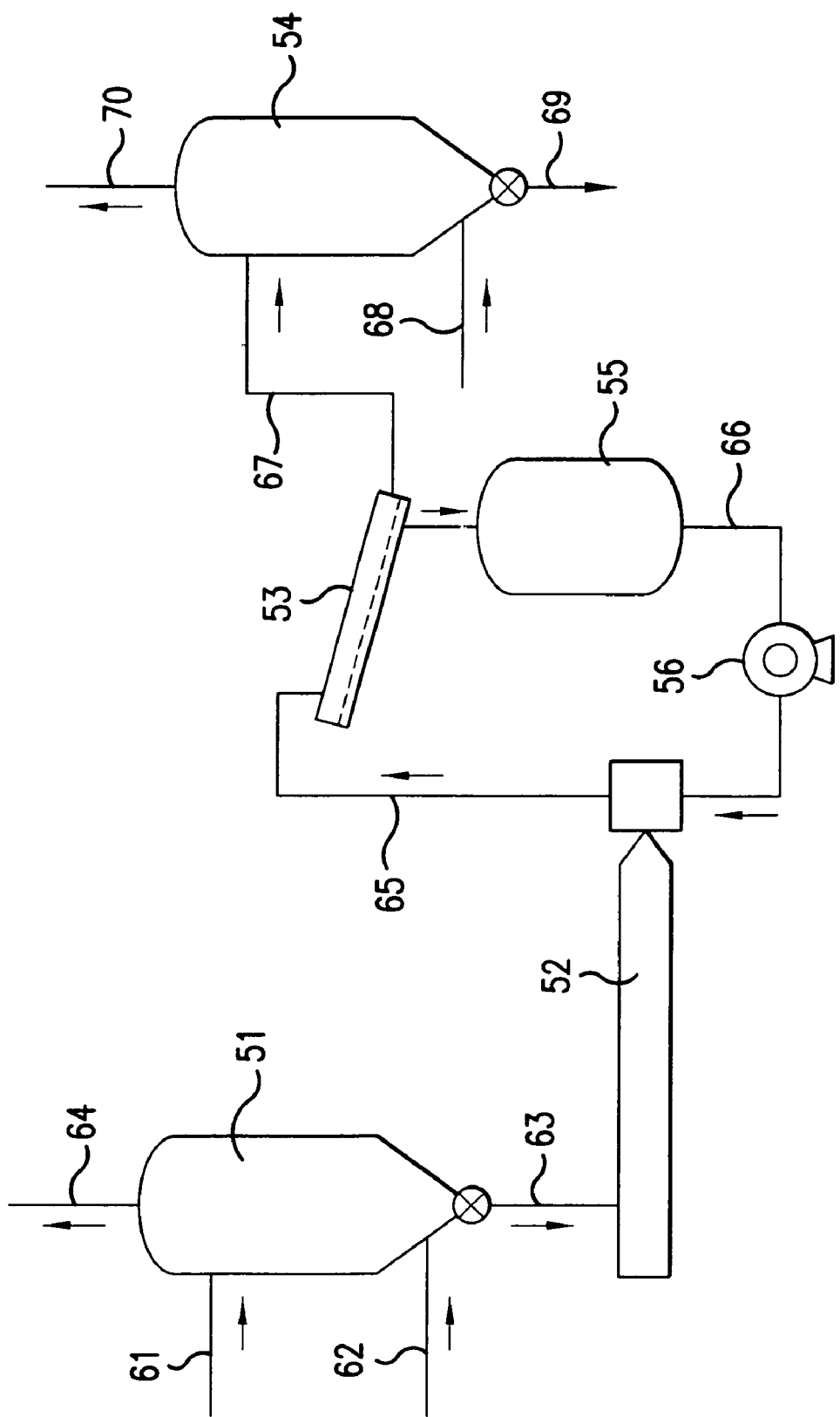
FIG. 3 is an explanatory view representing one example of a ligand removing step.
Figure 4:
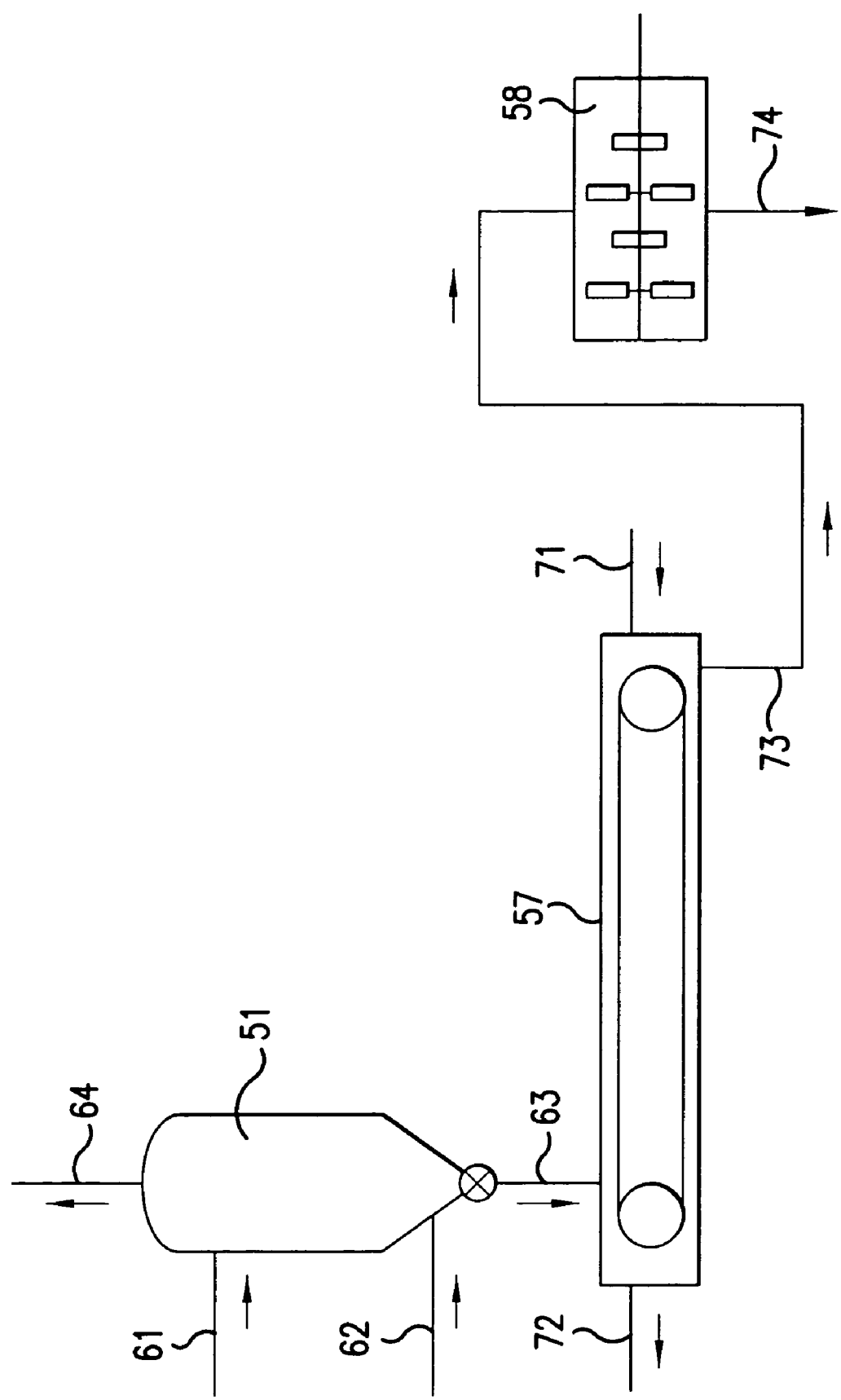
FIG. 4 is an explanatory view representing another example of a ligand removing step.

To state more specifically, the step of removing the ligand of the (co)polymer may be carried out using, for example, a step as shown in FIG. 3 or FIG. 4. FIG. 3 shows an explanatory view representing one example of the ligand removing step and FIG. 4 shows an explanatory view representing another example of the ligand removing step. In a silo represented by 51 in the figure, the catalyst decomposing step is carried out and in an extruder represented by 52, a silo represented by 54 and a drier represented by 57 in the figure, the ligand eliminating step is carried out.

An example in which water (steam) is used as the ligand-remover will be hereinafter explained. In the step shown in FIG. 3, the powder of the (co)polymer is supplied continuously from a powder supply pipe 61 to the silo 51. In the silo 51, inert gas containing steam is supplied to the silo 51 from a gas supply pipe 62 disposed on the lower part thereof. By this measure, the powder of the (co)polymer is brought into contact with the steam and the catalyst contained in the (co)polymer is decomposed. The steam-containing inert gas supplied to the silo is discharged from a gas discharging pipe 64 to the outside of the silo 51.

The powder of the (co)polymer which is in contact with the steam is discharged to the outside of the silo 51 from a powder discharge pipe 63 and then supplied to an extruder 52. The (co)polymer which is heat-melted in the extruder 52 is cooled by water and pelletized. By this measure, a part of the ligand liberated during catalyst decomposing step contained in the (co)polymer is removed. The obtained (co)polymer pellet is supplied together with water to a dehydrator 53 through a line 65. The dehydrated (co)polymer pellet is supplied to the silo 54 through a pellet supply pipe 67. The water separated by the dehydrator 53 is reused as cooling water through a circulating line 66. In the figure, 55 represents a water storage tank and 56 represents a pump.

In the silo 54, steam-containing inert gas is supplied to the silo 54 from a gas supply pipe 68 disposed on the lower part thereof. By this measure, the (co)polymer pellet is brought into contact with the steam, so that ligand generated from the decomposed catalyst contained in the (co)polymer is further removed. The steam-containing inert gas supplied to the silo 54 is discharged to the outside of the silo 54 from a gas discharge pipe 70. The (co)polymer pellet from which the decomposed catalyst ligand has been removed is discharged from a pellet discharge pipe 69.

In the step shown in FIG. 4, the (co)polymer powder is in contact with the steam-containing inert gas in the silo 51 where the catalyst contained in the (co)polymer is decomposed to metal and ligand. The (co)polymer powder which has been in contact with the steam is discharged to the outside of the silo 51 from the powder discharge pipe 63 and then supplied to the drier 57. It should be noted that the drier 57 is a belt drier, but is not limited to this type.

In the drier 57, heated inert gas is supplied from a gas supply pipe 71 and the (co)polymer powder is heated and also brought into contact with the inert gas. The ligand liberated by the catalyst decomposition contained in the (co)polymer is thereby removed. The inert gas supplied to the drier 57 is discharged from a gas discharge pipe 72.

The (co)polymer powder from which the decomposed catalyst has been removed is supplied to a crasher 58 through a line 73. In the crasher, the (co)polymer is crashed and then discharged from a discharge pipe 74.

In the ligand removing step, the ligand having a cyclopentadienyl structure left in the (co)polymer is decomposed and removed from the (co)polymer obtained in the polymerization step. Therefore, a polyolefin reduced in the emanation of odors during molding can be obtained.

Effect of the Invention

The olefinic polymer of the present invention is reduced in the content of low-molecular weight components such as oligomers and a ligand having a cyclopentadienyl structure which are components generating odors and changing tastes. The olefinic polymer is therefore reduced in the content of components generating odors and changing tastes when used in food uses and therefore scarcely damages the fragrance of foods.

The process of the present invention for producing an olefinic polymer can produce an olefinic polymer reduced in the content of low-molecular weight components such as oligomers and a ligand having a cyclopentadienyl structure which are components generating odors and changing tastes at low costs in a well producible manner.

EXAMPLES

The present invention will be hereinafter explained in more detail by way of examples, which, however, are not intended to be limiting of the present invention.

Example 1

(Preparation of a Solid Catalyst Component) 10 kg of silica ($SiO_2$) which had been dried at 250° C. for 10 hrs was suspended in 154 l of toluene, which was then cooled to 0° C. To the suspension was added dropwise 50.5 l of a toluene solution of methylaluminoxane (Al=1.52 mol/l) over one hour with keeping the temperature of the suspension at 0 to 5° C. In succession, the resulting solution was kept at 0° C. for 30 minutes, then raised to 95° C. over 1.5 hours and kept at 95° C. for 4 hours.

Thereafter, the temperature was dropped to 60° C. and the supernatant was removed by decantation. The solid catalyst component obtained in this manner was washed twice with toluene and then re-dispersed in 100 l of toluene to be a total amount of 160 l. 22.0 l of a toluene solution of bis(1,3-n-butylmethylcyclopentadienyl)zirconium dichloride (Zr=25.7 mmol/l) was added to the obtained suspension at 80° C. over 30 minutes and the resulting solution was further kept at 80° C. for 2 hours. Thereafter, the supernatant was removed and the residue was washed twice with hexane to obtain a solid catalyst component containing zirconium in an amount of 3.2 mg per 1 g of silica.

(Pre-Polymerization of the Solid Catalyst Component)

A 350 l reactor in which the atmosphere was thoroughly replaced by nitrogen was charged with 7.0 kg of the above solid catalyst component and then filled with hexane to prepare a hexane suspension having a total amount of 285 l. The system was cooled to 0° C. and then ethylene was blown into the hexane suspension of the solid catalyst component at a rate of 8 $Nm^3$/hr for 5 minutes. During this time, the system temperature was kept at 10 to 15° C.

After the supply of ethylene was suspended for a time, 2.4 mol of triisobutylaluminum and 1.2 kg of 1-hexene were supplied to the system, which was then made to be a closed system and then, the supply of ethylene was resumed. Ethylene was supplied at a flow rate of 8 $Nm3$/hr for 15 minutes and then flow rate was dropped to 2 $Nm^3$/hr to set the pressure in the system to 0.8 $kg/cm^2$·G. During this operation, the temperature of the system was raised to 35° C.

Thereafter, ethylene was supplied at a flow rate of 4 $Nm^3$/hr for 3.5 hours with controlling the system temperature to 32 to 35° C. During this operation, the pressure in the system was kept under 0.7 to 0.8 $kg/cm^2$·G. Next, the atmosphere in the system was replaced by nitrogen and the supernatant was removed. Then, the residue was washed twice with hexane. The supernatant obtained after the washing of the prepolymerized catalyst was colorless and transparent.

A prepolymerized catalyst containing 3 g of a prepolymer per 1 g of the solid catalyst component was obtained in the above manner. The intrinsic viscosity [η] of this prepolymerized catalyst component (prepolymer) which was measured at 135° C. in decaline was 2.1 dl/g and the content of 1-hexene units was 4.8% by weight. The prepolymerized catalyst had a good shape and a bulk density of 0.4 $g/cm^3$.

(Vapor Phase Polymerization)

A continuous fluidized-bed reactor as shown in FIG. 1 was used to carry out vapor phase polymerization.

Specifically, the prepolymerized catalyst obtained in the above manner was continuously supplied at a rate of 54 g/hr to polymerize ethylene with 1-hexene continuously in the presence of isopentane to obtain a linear low-density polyethylene (LLDPE).

The process was carried out in the following condition: polymerization temperature: 70° C., polymerization pressure: 1.7 MPa-G (gage pressure), partial pressure of ethylene: 1.1 MPa, space tower velocity: 0.80 m/s and concentration of isopentane in the gas (TOP gas) in the deceleration region of the reactor: 5 mol %. During this polymerization, the average molecular weight of the TOP gas was 31.4 g/mol and the density of the TOP gas was 20.7 $kg/m^3$. Also, the dewpoint of the TOP gas was 40.1° C., the temperature of the outlet side of the circulating gas in the heat exchanger was 62.3° C. and the ratio of the condensed liquid at the outlet side of the circulating gas was 0% by weight.

The above TOP gas is a mixture of ethylene, nitrogen, hydrogen, 1-hexene and isopentane.

The LLDPE obtained in the above manner had a density (ASTM D1505) of 903 $kg/m^3$ and an MFR (ASTM D1238) was 3.8 g/10 minutes.

(Catalyst Decomposing Step)

A powder of the above LLDPE was allowed to pass through a silo, into which steam-containing nitrogen gas was introduced and the pressure and the temperature were set to 0.5 kPa-G and 80° C. respectively, for a retention time of 5 minutes.

At this time, the ratio (water/PE) by weight of the water to the polyethylene powder (PE) was 0.001 and the ratio ($N_2$ (N-$m^3$)/PE (kg)) of the nitrogen gas to the polyethylene powder (PE) was 0.004.

(Ligand Eliminating Step)

The LLDPE powder treated in the above catalyst decomposing step was pelletized at an outlet temperature of 205° C. using a twin-screw extruder. Thereafter, the above LLDPE powder treated in the above catalyst decomposing step was allowed to pass through a silo, into which steam-containing air gas was introduced and the pressure and the temperature were set to 0.5 kPa-G and 80° C. respectively, for a retention time of 6 hours.

At this time, the ratio (water/PE) by weight of the steam (water) to the polyethylene pellet (PE) was 0.09 and the ratio (air (N-m$^3$)/PE (kg)) of the air to the polyethylene pellet (PE) was 0.14.

The residual amount, n-decane-soluble content and odors of the resulting LLDPE were evaluated in the same manner as in Example 1. The results are shown in Table 1. Incidentally, in the Table 1, first line, abbreviation 'EX' and 'CE' means example and Comparative Example respectively.

TABLE 1

|  | UNIT | CE-1 | CE-2 | CE-3 | CE-4 | CE-5 | EX-1 | EX-2 | CE-6 | EX-3 | EX-4 |
|---|---|---|---|---|---|---|---|---|---|---|---|
| Polymerization temperature | ° C. | 70 | 70 | 70 | 70 | 70 | 70 | 70 | 70 | 70 | 70 |
| Polymerization pressure | MPaG | 1.7 | 1.7 | 1.7 | 1.7 | 1.7 | 1.7 | 1.7 | 1.7 | 1.7 | 1.7 |
| Gas space tower velocity | m/s | 0.8 | 0.8 | 0.8 | 0.8 | 0.8 | 0.8 | 0.8 | 0.8 | 0.8 | 0.8 |
| Composition of the TOP gas in the polymerization vessel | | | | | | | | | | | |
| Ethylene | mol % | 55.5 | 55.5 | 55.5 | 55.5 | 55.5 | 55.5 | 55.5 | 55.5 | 55.5 | 55.5 |
| Hexene-1 | mol % | 1.9 | 1.9 | 1.9 | 1.9 | 2 | 2 | 2 | 1.9 | 1.9 | 1.9 |
| Hydrogen | mol ppm | 333 | 333 | 333 | 333 | 340 | 340 | 340 | 326 | 326 | 326 |
| Nitrogen | mol % | 42.3 | 42.3 | 42.3 | 42.3 | 36.7 | 36.7 | 36.7 | 28.5 | 28.5 | 28.5 |
| Isopentane | mol % | 0 | 0 | 0 | 0 | 5. | 5 | 5 | 15 | 15 | 15 |
| Average molecular weight of the TOP gas in the polymerization vessel | g/mol | 29.2 | 29.2 | 29.2 | 29.2 | 31.4 | 31.4 | 31.4 | 35.8 | 35.8 | 35.8 |
| Density of the gas in the polymerization vessel | kg/m3 | 19 | 19 | 19 | 19 | 20.7 | 20.7 | 20.7 | 24.3 | 24.3 | 24.3 |
| Dew point of the gas in the polymerization vessel | ° C. | 24.1 | 24.1 | 24.1 | 24.1 | 40.1 | 40.1 | 40.1 | 62 | 62 | 62 |
| Gas temperature at the outlet side of the circulating gas in the heat exchanger | ° C. | 61.5 | 61.5 | 61.5 | 61.5 | 62.3 | 62.3 | 62.3 | 63.5 | 63.5 | 63.5 |
| Ratio of the condensed liquid at the outlet side of the circulating gas in the heat exchanger | wt % | 0 | 0 | 0 | 0 | 0 | 0 | 0 | 0 | 0 | 0 |
| Supply amount of the prepolymerized catalyst | g/h | 58 | 58 | 58 | 58 | 54 | 54 | 54 | 49 | 49 | 49 |
| Polymerized amount | kg/h | 100 | 100 | 100 | 100 | 100 | 100 | 100 | 100 | 100 | 100 |
| Polyethylene | | | | | | | | | | | |
| Density | kg/m3 | 903 | 904 | 903 | 903 | 902 | 903 | 904 | 901 | 903 | 902 |
| MFR | g/10 min | 3.7 | 3.9 | 3.6 | 3.8 | 3.8 | 3.8 | 3.5 | 3.9 | 3.5 | 3.4 |
| Retention time | hrs | 3 | 3 | 3 | 3 | 3 | 3 | 3 | 3 | 3 | 3 |
| STY | kg/h · m3 | 100 | 100 | 100 | 100 | 100 | 100 | 100 | 100 | 100 | 100 |
| Catalyst activity | *1) | 6900 | 6900 | 6900 | 6900 | 7400 | 7400 | 7400 | 8200 | 8200 | 8200 |
| Powder steaming time | min | 0 | 5 | 5 | 5 | 0 | 5 | 5 | 0 | 5 | 5 |
| Pellet steaming time | hrs | 0 | 6 | 12 | 30 | 0 | 6 | 12 | 0 | 6 | 12 |
| Concentration of the ligand | ppb | 10 | 1 | <1 | 2 | 10 | 1 | <1 | 9 | 1 | <1 |
| n-Decane-soluble content | wt % | 12.2 | 11.8 | 11.1 | 11.6 | 8.4 | 8.1 | 7.5 | 2.3 | 2.2 | 1.9 |
| Odor | — | X | X | Δ | ○ | X | ○ | ⊙ | X | ○ | ⊙ |

*1) g-PE/g-Bare Cat.

(Evaluation)

The LLDPE treated in the above manner was evaluated as to the residual amount of the ligand, n-decane-soluble content and odors. The results are shown in Table 1.

The odor of the LLDPE treated in the above manner was evaluated in the following manner.

⊙: None of the three panelists felt any odor.

○: One panelist among the three panelists felt some odors, but didn't feel a strong odor.

Δ: Two or three panelists among the three panelists felt some odors, but didn't feel a strong odor.

x: All of the three panelists felt a strong odor.

Examples 2 to 4 and Comparative Examples 1 to 6

LLDPEs were obtained in the same manner as in Example 1 except that the concentration of isopentane contained in the TOP gas in the polymerizing vessel, the average molecular weight of the TOP gas in the polymerizing vessel, the density of the gas in the polymerizing vessel, the gas temperature at the outlet side of the circulating gas in the heat exchanger and the like were changed to the conditions shown in Table 1 in Example 1.

What is claimed is:

1. A process for producing an olefinic polymer by (co) polymerizing one or two or more olefins selected from the group consisting of ethylene and α-olefins having 3 to 20 carbon atoms in the presence of a metallocene type catalyst in a gas phase using a fluidized-bed reactor, the process comprising:
   a polymerization step of (co)polymerizing olefins with allowing a saturated aliphatic hydrocarbon to exist in a concentration of 2 to 30 mol % in said fluidized-bed reactor; and
   a ligand removing step of bringing the resulting (co) polymer into contact with a ligand-remover and then heating said (co)polymer which has been brought into contact with the ligand-remover.

2. A process for producing an olefinic polymer, wherein the olefinic polymer with 10% by weight or less of the n-decane soluble content and with 5 ppb by weight or less of a ligand having a cyclopentadienyl structure is produced by the process according to claim 1 for producing an olefinic polymer.

* * * * *